US009242545B2

(12) United States Patent
Hawkins et al.

(10) Patent No.: US 9,242,545 B2
(45) Date of Patent: Jan. 26, 2016

(54) NEGATIVE-TORQUE DOWNSHIFT EXECUTION FOR FIXED-GEAR TRANSMISSIONS

(75) Inventors: Craig J. Hawkins, Howell, MI (US); Adam J. Heisel, Garden City, MI (US); Christopher E. Whitney, Commerce, MI (US); Matthew D. Whitton, Howell, MI (US); Roger Joseph Rademacher, Holt, MI (US); Keith D. Van Maanen, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1091 days.

(21) Appl. No.: 12/908,180

(22) Filed: Oct. 20, 2010

(65) Prior Publication Data

US 2012/0101697 A1    Apr. 26, 2012

(51) Int. Cl.

| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *G06F 19/00* | (2011.01) |
| *B60K 6/48* | (2007.10) |
| *F16H 61/06* | (2006.01) |
| *B60W 10/02* | (2006.01) |
| *B60W 10/06* | (2006.01) |
| *B60W 10/08* | (2006.01) |
| *B60W 10/11* | (2012.01) |
| *B60W 20/00* | (2006.01) |
| *B60W 30/19* | (2012.01) |

(52) U.S. Cl.
CPC .................. *B60K 6/48* (2013.01); *B60W 10/02* (2013.01); *B60W 10/06* (2013.01); *B60W 10/08* (2013.01); *B60W 10/11* (2013.01); *B60W 20/00* (2013.01); *B60W 30/19* (2013.01); *F16H 61/061* (2013.01); *B60K 2006/4825* (2013.01); *B60Y 2300/18125* (2013.01); *F16H 2061/062* (2013.01); *Y02T 10/6221* (2013.01); *Y02T 10/6252* (2013.01); *Y02T 10/6286* (2013.01)

(58) Field of Classification Search
USPC .......................................... 701/22, 51; 477/15
See application file for complete search history.

(56) References Cited

U.S. PATENT DOCUMENTS

| | | | |
|---|---|---|---|
| 7,908,067 B2 * | 3/2011 | Soliman et al. ................. 701/54 |
| 8,224,513 B2 * | 7/2012 | Soliman et al. ................. 701/22 |
| 2004/0192494 A1 * | 9/2004 | Ozeki et al. ........................ 477/3 |
| 2006/0142117 A1 * | 6/2006 | Colvin et al. ................. 477/107 |
| 2007/0105679 A1 * | 5/2007 | Tabata et al. ...................... 475/5 |
| 2009/0233757 A1 * | 9/2009 | Soliman ................. B60K 6/442 477/3 |
| 2009/0233758 A1 * | 9/2009 | Soliman et al. .................... 477/3 |
| 2009/0325760 A1 * | 12/2009 | Soliman ................. B60K 6/365 477/98 |
| 2009/0326778 A1 * | 12/2009 | Soliman ................. B60K 6/442 701/84 |
| 2010/0228412 A1 * | 9/2010 | Sah ................................ 701/22 |
| 2011/0239801 A1 * | 10/2011 | Inagaki et al. ............... 74/473.1 |
| 2012/0265382 A1 * | 10/2012 | Nefcy et al. ...................... 701/22 |

* cited by examiner

*Primary Examiner* — Yonel Beaulieu
*Assistant Examiner* — Lail Kleinman
(74) *Attorney, Agent, or Firm* — Quinn Law Group, PLLC

(57) ABSTRACT

A method of executing a downshift in a fixed-gear powertrain having an input node and an output node related by a starting speed ratio before the downshift and a finishing speed ratio after is provided. The downshift includes a torque phase and an inertia phase. A starting output torque is calculated as a function of a starting driver request. An electric machine applies a starting regenerative input torque which is calculated as substantially equal to the starting output torque divided by the starting speed ratio. A finishing output torque is calculated as a function of a finishing driver request. The electric machine applies a finishing regenerative input torque which is calculated as substantially equal to the finishing output torque divided by the finishing speed ratio.

9 Claims, 4 Drawing Sheets

NEGATIVE-TORQUE DOWNSHIFT EXECUTION FOR FIXED-GEAR TRANSMISSIONS

TECHNICAL FIELD

This disclosure relates to shift execution torque management in fixed-gear transmissions of hybrid powertrains.

BACKGROUND

Vehicle transmissions transfer power and torque from an engine to the vehicle output (axles or wheels). When the vehicle is equipped with an additional primary mover, such as an electric machine, the transmission may also transfer torque and power from the electric machine to provide traction for the vehicle. Fixed-gear transmissions allow the engine to operate within a narrow range of speeds while providing a wide range of output speeds.

Different gears or modes of the transmission provide different, selectable speed ratios or gear ratios, and also different levels of torque multiplication. Changing the speed ratio of the transmission changes the ratio of input speed to the output speed and changes the torque multiplication between the input and the output. Hybrid powertrains include both an internal combustion engine and an alternative power source, such as one or more electric machines coupled with an energy storage device.

SUMMARY

A method of executing a downshift in a fixed-gear powertrain having an input node and an output node is provided. The input node is connected to an engine and an electric machine and the output node is connected to a final drive. The input node and the output node are related by a starting speed ratio before the downshift and a finishing speed ratio larger than the starting speed ratio after the downshift. The method includes executing a torque phase by engaging an oncoming clutch, and executing an inertia phase after executing the torque phase. The torque phase has a beginning and an end and occurs at the starting speed ratio, and the inertia phase has a beginning and an end and brings the input node from the starting speed ratio to the finishing speed ratio.

The method also includes monitoring a starting driver request at the beginning of the downshift; calculating a starting output torque for the output node as a function of the starting driver request; calculating a starting regenerative input torque at the input node; and applying the starting regenerative input torque with the electric machine at the beginning of the torque phase. The starting regenerative input torque is substantially equal to the starting output torque divided by the starting speed ratio.

The method also includes monitoring a finishing driver request at the end of the downshift; calculating a finishing output torque for the output node as a function of the finishing driver request; calculating a finishing regenerative input torque at the input node; and applying the finishing regenerative input torque with the electric machine at the end of the inertia phase. The finishing regenerative input torque is substantially equal to the finishing output torque divided by the finishing speed ratio.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
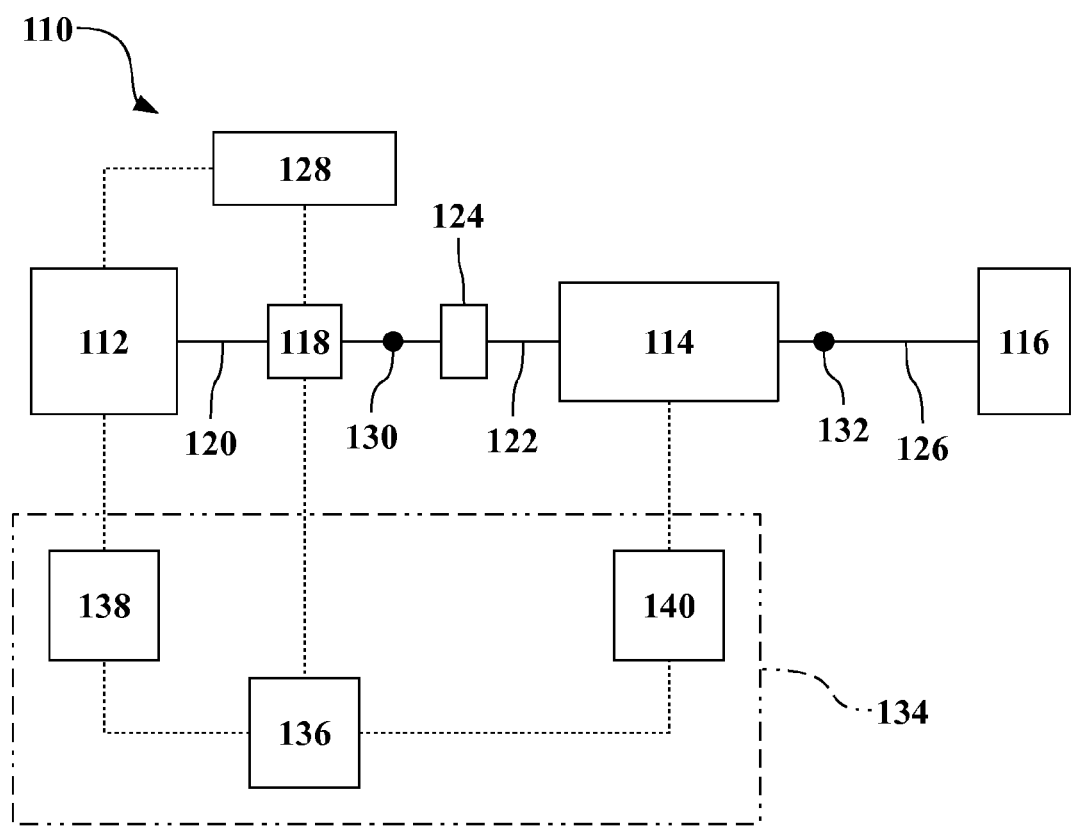
FIG. 1 is a schematic diagram of an exemplary hybrid vehicle powertrain having an internal combustion engine and an electric machine drivingly connected to a fixed gear transmission.

Referring to the drawings, wherein like reference numbers correspond to like or similar components throughout the several figures, there is shown in FIG. 1 a schematic diagram of an exemplary vehicle powertrain system, designated generally as powertrain 110. The powertrain 110 includes an internal combustion engine 112 drivingly connected to a transmission 114. The transmission 114 is a fixed-gear transmission, and is in power-flow communication with a final drive system 116.

The final drive system 116 may include a front or rear differential, or other torque-transmitting mechanism, which provides torque output to one or more wheels through respective vehicular axles or half-shafts (not shown). The wheels may be either front or rear wheels of the vehicle on which they are employed, or they may be a drive gear of a track vehicle. Those having ordinary skill in the art will recognize that the final drive system 116 may include any known configuration, including front-wheel drive (FWD), rear-wheel drive (RWD), four-wheel drive (4WD), or all-wheel drive (AWD), without altering the scope of the claimed invention.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The transmission 114 is designed to selectively receive a portion of its driving power from the engine 112 and a portion from an electric machine 118. A crankshaft 120, which may also be referred to as an engine output shaft. The transmission 114 received power from an input member 122, which may receive power through a fluid coupling or a torque converter 124. The torque converter 124 may include a torque converter clutch (not separately shown, also referred to as a TCC) which selectively locks the crankshaft 120 to the input member 122, such that the two rotate together.

The input member 122 transfers power to the transmission 114, which distributes output power and output torque through an output shaft 126 to the final drive system 116 to propel the vehicle (not shown). A battery 128 acts as an energy storage device for the powertrain 110 and may be a chemical battery, battery pack, or another energy storage device recognizable to those having ordinary skill in the art.

The electric machine 118 may be physically located between the engine 112 and the transmission 114 and concentric with the crankshaft 120. Alternatively, the electric machine 118 may be offset from the crankshaft 120 and linked via a belt or chain (not shown), which may be referred to as a belt alternator starter (BAS) system. The electric machine 118 may also be located, or connected to, either side of the engine 112 relative to the transmission 114. Furthermore, the electric machine 118 may be selectively linked to the crankshaft 120 via a clutch or other torque-transmitting mechanism (not shown), via a planetary gearset (not shown), or some combination thereof.

Nodes at specific locations within the powertrain 110 denote points of measure, control, or both. In FIG. 1, some of the nodes are represented by black circles or dots, and are illustrative of the location of the node but may not represent actual structure. An input node 130 is located at the input to the transmission 114. An input speed, Ni, an input acceleration, Ni_dot, and an input torque, Ti, are measured at the input node 130. Depending upon the direction of rotation chosen as positive, the input speed may be either positive or negative, and, as used herein, acceleration refers both to positive acceleration and to negative acceleration (deceleration). The input node 130 may be located prior to (left, as viewed in FIG. 1) the torque converter 124 or after the torque converter 124, on the input member 122. However, when the torque converter clutch is locked, both the crankshaft 120 and the input member 122 rotate synchronously, essentially as one member.

The input node 130 usually rotates in concert with the crankshaft 120 and the engine 112. Depending upon the configuration of the electric machine 118, the input node 130 may be locked to the electric machine 118, such that a speed and acceleration of the electric machine 118 is always equal to the input speed and the input acceleration. If the crankshaft 120 and the electric machine 118 are linked by selective engagement of a clutch, then the input node 130 will rotate with the electric machine 118 only when the clutch is engaged. Furthermore, if the crankshaft 120 and the electric machine 118 are linked by belts (in a BAS system) then there may be a speed ratio change between the input node 130 and the electric machine 118 due to mechanical advantage of the linking pulleys or gears.

Whenever the electric machine 118 affects the powertrain 110, the input node 130 and the electric machine 118 are both rotating. If the engine 112 is not completely disconnected from the electric machine 118, then the engine 112 will also be rotating. When the engine 112 is off—such as when fuel is cut off—the engine 112 is still turning and may provide fixed or variable negative torque due to friction or vacuum. Much of the description herein will assume that the electric machine 118 and the input node 130 are locked together with the engine 112, such that one cannot rotate without the other, which is true regardless of whether the connection is direct, via gearing, or via belts and pulleys, and is true if intermittent clutches are engaged.

An output node 132 is located on the output shaft 126 of the transmission 114. An output speed, No, an output acceleration, No_dot, and an output torque, To, are measured at the output node 132. Output speed may also be positive or negative, with positive output speed generally referring to the direction of rotation which propels the vehicle forward. The output node 132 rotates in concert with the final drive system 116, and generally rotates whenever the wheels of the vehicle are moving. The powertrain 110 may include additional nodes tracked and controlled by the control system 134 for the powertrain 110.

The transmission 114 varies the gear ratio or speed ratio between the input node 130 and the output node 132 by selecting from one of a plurality of fixed-gear ratios. For example, and without limitation, a third gear of the transmission 114 may have a gear ratio of about 1.89 and a fourth gear may have a gear ratio of about 1.45. Selection of any specific gear ratio includes engagement of different combinations of a plurality of torque-transmitting mechanisms (such as clutches or brakes, not separately shown) within the transmission 114 to activate different paths through one or more differential gear arrangements, such as epicyclic planetary gear sets (not separately shown).

The powertrain 110 includes both the engine 112 and the electric machine 118 and may, therefore, be referred to as a hybrid powertrain. However, other alternative fuel primary movers and purely electric powertrains and transmissions may also be used with the algorithms and methods described herein. For example, the engine 112 may be removed from the powertrain 110 and a fuel cell (not shown) or an electrical plug input (not shown) may be placed in communication with the powertrain 110. The engine 112 may be any type of internal combustion engine.

By controlling the engine 112 and the electric machine 118, the control system 134 controls the input node 130. By also selecting the gear ratio for the transmission 114, the control system 134 varies the speed, acceleration, and output torque of the output node 132 and the final drive system 116.

FIG. 1 also shows a highly-schematic control architecture or control system 134 for the powertrain 110. Each component of the control system 134 may include distributed controller architecture, such as a microprocessor-based electronic control unit (ECU). The control system 134 may include one or more components with a storage medium and a suitable amount of programmable memory, which are capable of storing and executing one or more algorithms or methods to effect control of the powertrain 110.

The individual components of the control system 134 shown in FIG. 1 are not limiting, the names given to each component may vary with specific applications of the powertrain 110, and the linkages or wiring between components is purely illustrative of one possible communication network. Furthermore, specific functions or processes of any individual component of the control system 134 may be shifted to another component, or several functions may be combined. Each of the individual components of the control system 134 shown may actually be a part of a single control module carrying out all of the control functions for the powertrain 110.

The illustrative control system 134 shown in FIG. 1 includes a hybrid control processor or HCP 136 which generally oversees operation of the powertrain 110 and directly commands operation of the electric machine 118. An engine control module or ECM 138 controls the engine 112. A transmission control module or TCM 140 controls the transmission 114, including selecting the gear ratio by engaging specific torque-transmitting mechanisms. Additional modules or processors may be present within the control system 134.

Figure 2:
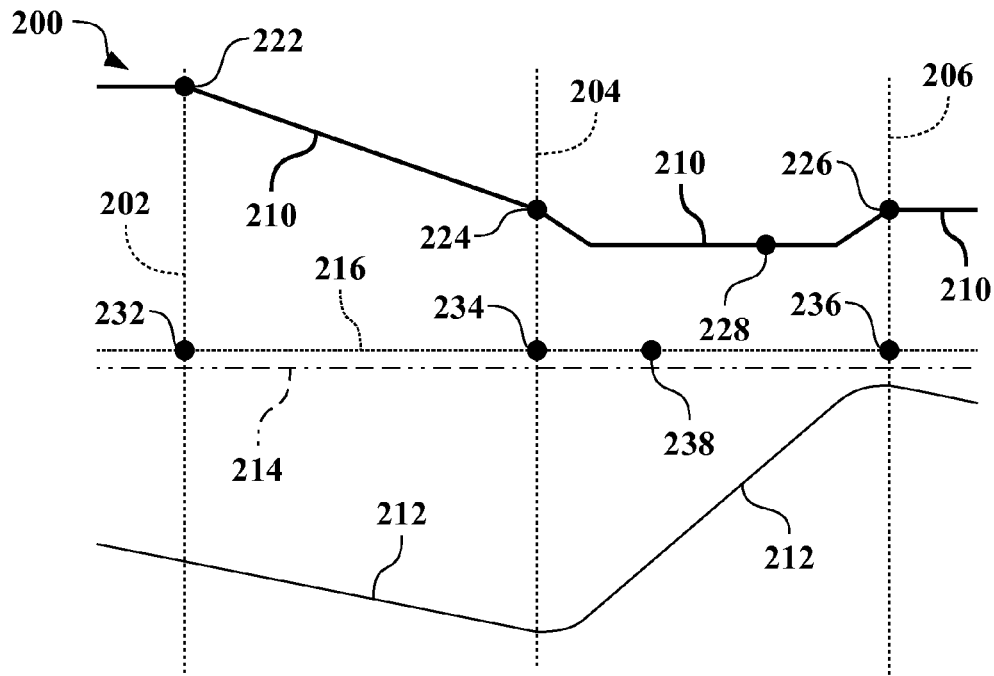
FIG. 2 is an illustrative chart of shift execution with constant input torque.
Figure 3:
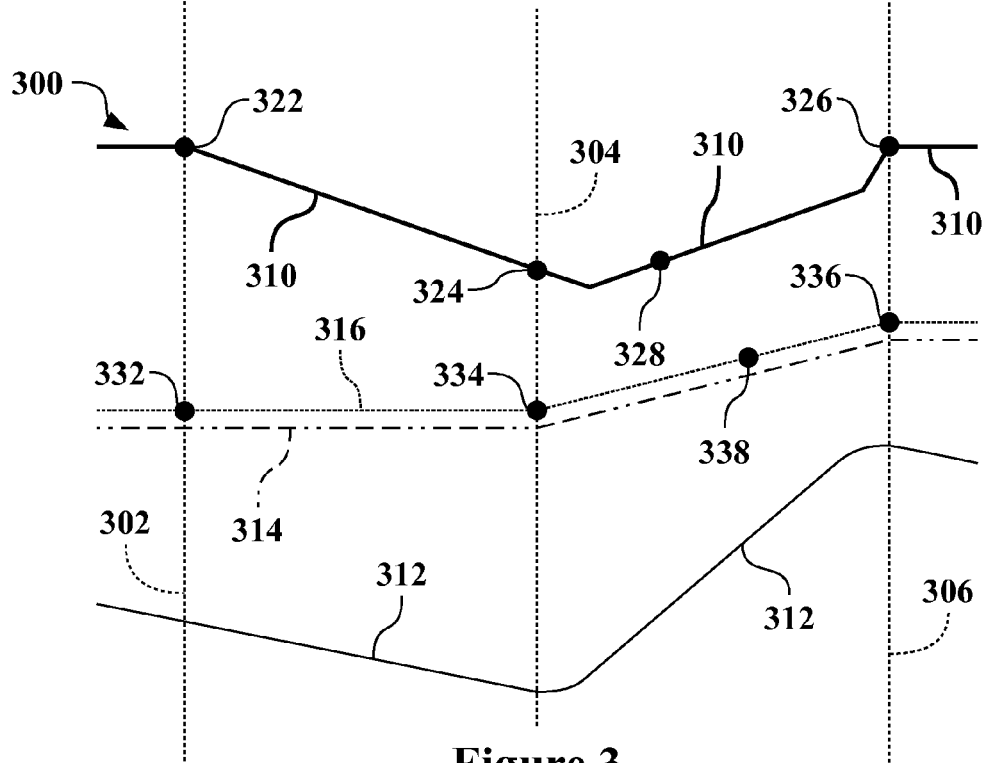
FIG. 3 is an illustrative chart of shift execution with ending output torque matching starting output torque.
Figure 4:
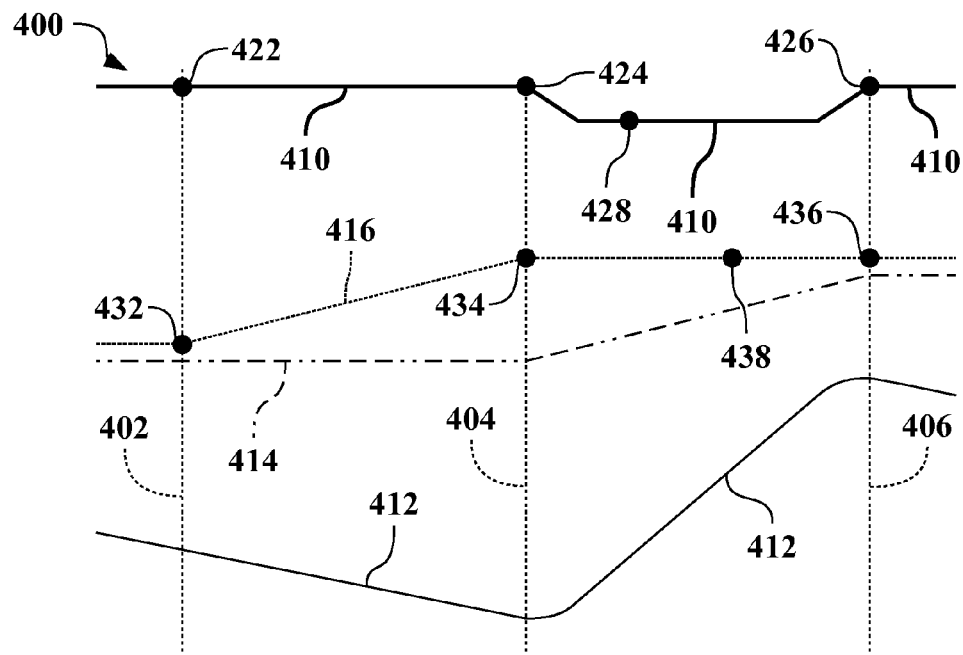
FIG. 4 is an illustrative chart of shift execution with ending output torque matching and with torque phase offset management.
Figure 5:
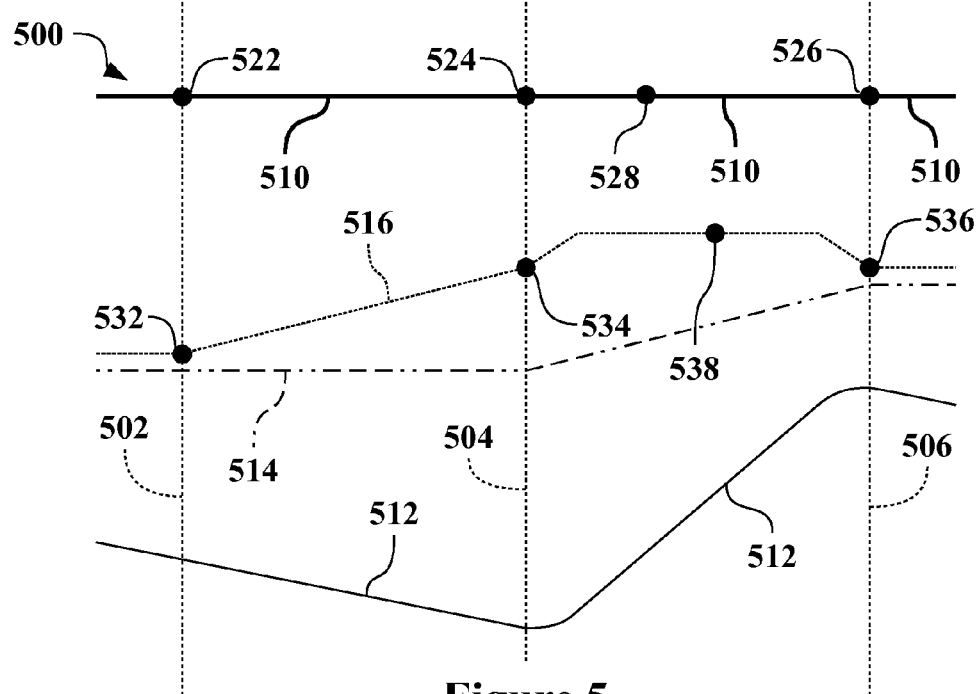
FIG. 5 is an illustrative chart of shift execution with ending output torque matching, with torque phase offset management, and with inertia phase offset management.

Referring now to FIGS. 2-5, and with continued reference to FIG. 1, there are shown four shift execution management strategies showing characteristics of the powertrain 110 over time (moving from left to right). FIG. 2 shows an illustrative shift execution chart 200 in which constant input torque is maintained. FIG. 3 shows another shift execution chart 300, showing an execution strategy in which ending output torque is matched to starting output torque. FIG. 4 shows a shift execution chart 400 with ending output torque matching and also with torque phase offset management. FIG. 5 shows another illustrative shift execution chart 500, showing an execution strategy having ending output torque matching, torque phase offset management, and also inertia phase loss management, such that substantially constant output torque is maintained throughout the shift.

Each of the illustrative shift execution charts in FIGS. 2-5 shows a downshift from fourth gear to third gear of the transmission 114. Furthermore, each of the examples is occurring while the vehicle is slowing down due to negative output torque being distributed through the final drive system. Because the powertrain 110 is a hybrid powertrain, this may also be referred to as a period of regenerative braking, during which the electric machine 118 is converting kinetic energy of the vehicle into electric energy which may then be stored in the battery 128 (or used to power electric components).

Negative (regenerative) torque is transmitted by the electric machine 118 to the crankshaft 120 and the input member 122. To improve transmission of negative torque between the crankshaft 120 and the input member 122, the torque converter clutch may be locked, causing the crankshaft 120 and the input member 122 to rotate concurrently. The fixed-gearing of the transmission 114 transfers the negative torque from the input node 130 to the output node 132.

The regenerative period may begin as the driver applies a brake pedal or lets off of an accelerator pedal, requesting deceleration. Alternatively, a cruise control module or other torque requester may command a steady deceleration of the vehicle. As vehicle speed decreases, the control system 134 will execute the downshift—possibly through the TCM 140—to maintain the relationship between input speed and output speed. The HCP 136 or another part of the control system 134 for the vehicle may convert the requested driving condition to an axle torque request or an output torque request. During the deceleration request, the engine 112 is in an off state and is either un-fueled or decoupled from the input node 130 (if possible, not shown in FIG. 1). The state of engine 112 may also be referred to as a closed-throttle state, because air is substantially prevented from entering the combustion chambers.

The charts shown in FIGS. 2-5 each show fourth gear to third gear downshifts, and dashed lines further separate execution of the downshift into two phases. The downshift begins at a line 202, which is the beginning of a torque phase. A line 204 marks the end of the torque phase and the beginning of an inertia phase. The shift and the inertia phase end at a line 206.

Executing the torque phase includes engaging an oncoming clutch. Many shifts in fixed-gear transmissions (and in electrically-variable transmissions) include disengaging one clutch (an offgoing clutch) and engaging another clutch (the oncoming clutch). The torque phase occurs at the starting speed ratio while the oncoming clutch increases from zero clutch capacity to sufficient clutch capacity to start the ratio change. The inertia phase begins after completing the torque phase. The inertia phase brings the input node 130 from the starting speed ratio to the finishing speed ratio, relative to the output node 132.

A line 210 represents output acceleration of the transmission 114 during the shift execution chart 200. The output acceleration is negative throughout the shift execution chart 200 and the vehicle is decelerating. Output acceleration is proportional to output torque from the transmission 114, so the line 210 may also closely track output torque and may be used to compare relative output torque levels during the downshift. The shift execution chart 200 begins at a first output torque and first output acceleration for the output node 132, as shown on the line 210 just prior to beginning the torque phase (as line 202).

Note that the lines and characteristics of the charts shown in FIGS. 2-5 may not be shown to scale. However, the downward direction refers to a decrease in the illustrated characteristics and the upward direction to an increase. Each of the charts illustrates an approximately equivalent time period, but some downshifts may take relatively more or less time to complete.

The input speed of the input node 130 is shown on a line 212. During steady-state operation, the output torque and output speed are related to the input torque and input speed by the starting speed ratio (fourth gear ratio) at the beginning of the shift and by the finishing speed ratio (third gear ratio) at the end of the shift. When downshifting, the finishing speed ratio is larger than the starting speed ratio, so the input speed increases during the inertia phase.

Input torque at the input node 130 is represented by two different lines in FIG. 2. A line 214 represents a baseline torque, which is derived from the output torque request (this may also be referred to as the driver-based torque request). A line 216 represents a net input torque, which is the baseline torque plus a machine torque request, which varies the net input torque away from the torque-request-derived baseline torque.

When there is no separate machine torque request, the lines 214 and 216 may actually be overlapping, but the lines 214 and 216 are shown as slightly offset in FIG. 2 for illustrative purposes. Both the baseline torque and the net input torque are negative in FIGS. 2-5, such that the combined torque from the engine 112 and the electric machine 118 is negative, which usually represents regenerative braking by the electric machine 118. The baseline torque may be produced by the engine 112, the electric machine 118, or both. However, because the engine 112 is either un-fueled or decoupled during the downshift, the electric machine 118 is the only variable torque actuator which can effect a change in the baseline torque.

The baseline torque and the machine torque request combine to produce the net (or total) input torque to the transmission 114. If the driver changes the torque request at any time during the downshift, that change will be reflected in the baseline torque on line 214. If the control system 134 changes the machine torque request—to, for example, increase or decrease the amount of regenerative braking—at any time during the downshift, that change will be reflected in the net input torque on line 216. Note that, because input and output torque are both in the negative torque domain, if the shift execution chart 200 were drawn with the output torque shown separately (and to scale) the output torque would actually be shown below the baseline torque and the net input torque, due to the effects of torque multiplication by the fixed-gear transmission 114.

A point 222 illustrates a first output acceleration. In rotating systems for components, torque is substantially equal to acceleration multiplied by the moment of inertia of the rotating system or components. Therefore, the point 222 is also illustrative of a first output torque. The first output torque is the output torque at the beginning of the downshift and at the beginning of the torque phase. The first output torque is the same in each of the downshifts illustrated in FIGS. 2-5.

A point 224 illustrates a second output acceleration and a second output torque, and a point 226 illustrates a third output acceleration and a third output torque. The second output torque is the output torque at the end of the torque phase and the beginning of the inertia phase. The third output torque is the output torque at the end of the inertia phase and the end (completion) of the downshift. A fourth point 228 illustrates an intermediate state during the inertia phase and having a fourth output acceleration and a fourth output torque. The whole shift execution chart 200 takes place in the negative torque domain, so the output torque throughout the downshift is negative and the electric machine 118 is providing regenerative braking.

A point 232 illustrates a first input torque, and may also be referred to as a starting regenerative input torque. A point 234 illustrates a second input torque, and may also be referred to as a torque phase input torque. A point 236 illustrates a third input torque, and may also be referred to as a finishing regenerative input torque. A point 238 illustrates a fourth input torque, which is an intermediate value during the inertia phase. The fourth input torque may also be referred to as a temporary inertia input torque.

For the shift execution chart 200 shown in FIG. 2, input torque is kept constant. Each of the respective input torques values may be considered to be an input torque command or operating value calculated to achieve a respective output torque value.

During the shift execution chart 200 shown in FIG. 2, both the baseline torque and the net input torque are constant, such that the net input torque is constant throughout the torque phase and the inertia phase. However, the output acceleration and the output torque are not consistent throughout the shift execution chart 200. The drops in output acceleration (as shown on line 210) are due to the effects of executing the ratio change (the downshift) and also to the effects of the completed ratio change.

During the torque phase (from line 202 to line 204), increasing the torque-carrying capacity of the oncoming clutch changes the flow of torque between the input node 130 and the output node 132. As the oncoming clutch engages, it effectively changes the torque multiplication powerflow through the transmission 114. Even though the actual speed ratio between the input node 130 and the output node 132 has yet to begin to change, the torque multiplication between the nodes changes as the oncoming clutch begins to carry torque during the torque phase. Therefore, during the torque phase the output torque from the transmission 114 decreases from the first output torque to the second output torque (as shown by the decrease between point 222 and 224). This decrease may be referred to as a torque phase offset.

As shown in FIG. 2, even though the output torque request by the driver remains constant (line 214 is constant) the output torque changes between the beginning and the end of the downshift. Comparison between point 226 and point 222 shows that the third output torque is lower than the first output torque. This decrease in output torque occurs due to the ratio change. Using the illustrative gear ratios discussed herein, in fourth gear the first input torque is multiplied by 1.45, and in third gear the third input torque is multiplied by 1.89. Therefore, the third output torque is the result of more torque multiplication and, because the input torque is negative, the third output torque is more negative (i.e. lower) than the first output torque.

During the inertia phase, between line 204 and line 206, the oncoming clutch has gained sufficient capacity to change from the starting speed ratio to the finishing speed ratio. The ratio change occurs by bringing the input speed up to the level needed for the finishing speed ratio—because the output speed is already controlled by the vehicle speed and output torque. However, the input speed increase requires that the speed of the engine 112 and the speed of the electric machine 118 also increase, which requires overcoming the rotational inertia of those components in order to quickly increase their rate of rotation.

The inertial drag of the electric machine 118 and (especially) the engine 112 causes a temporary decrease in output acceleration and output torque, as shown by the line 210 at the point 228. During the inertia phase the output torque decreases to the fourth output torque while the engine 112 is being rapidly accelerated up to the finishing speed ratio. Because some of the input torque is being used to overcome inertia instead of being transferred to the output node 132, an additional amount of clutch torque is required to overcome the inertia torque. The additional torque required to overcome the inertia of the engine 112 and of the electric machine 118 again flows to the output node 132 after the ratio change of the inertia phase is completed. Therefore, output torque temporarily decreases from the second output torque to the fourth output torque but then increases back to the third output torque—as illustrated by the drop from the point 224 to the point 228 and the return back up to the point 226. The temporary decrease in the output torque due to inertia may be referred to as an inertial torque offset.

Referring now to FIG. 3, and with continued reference to FIGS. 1-2, the shift execution chart 300 shows an alternative downshift management scheme or control in which the ending output torque is substantially equivalent to the beginning output torque. Similar to the shift execution chart 200 shown in FIG. 2, the shift execution chart 300 shown in FIG. 3 includes lines 302, 304, and 306 dividing the downshift into the torque phase and the inertia phase.

The characteristics illustrated in FIG. 3 are very similar to those shown in FIG. 2 (and also subsequently in FIGS. 4 and 5). A line 310 represents output acceleration and output torque of the transmission 114 during the shift execution chart 300, and the input speed at the input node 130 is shown on a line 312. The input speed profile is substantially identical in FIGS. 2-5. A line 314 shows the baseline torque and a line 316 shows the net input torque during the downshift.

A point 322 illustrates a first output acceleration and a first output torque. A point 324 illustrates a second output acceleration and a second output torque, and a point 326 illustrates a third output acceleration and a third output torque. A fourth point 328 illustrates an intermediate state during the inertia phase and having a fourth output acceleration and a fourth output torque. Similarly, a point 332 illustrates a first input torque, a point 334 illustrates a second input torque, and a point 336 illustrates a third input torque. A point 338 illustrates a fourth input torque, which is an intermediate value during the inertia phase.

As shown on the line 310 of FIG. 3, the third output torque (point 326) is substantially equal to the first output torque (point 322). Therefore, the shift execution chart 300 matches output torque at the end of the downshift to the output torque at the beginning of the downshift. Because the speed ratio changes between the beginning of the inertia phase (at line 304) and the end of the inertia phase (at line 306), the input torque to the transmission 114 also has to change in order to match output torque.

As shown on the line 316, the net input torque increases steadily during the inertia phase. The increase in the net input torque is caused by an increase in the baseline torque, shown on the line 314.

After calculating the third output torque to be substantially equal to the first output torque, the control system 134 calculates the third input torque (which is a third regenerative input torque). The third input torque is substantially equal to the third output torque divided by the finishing speed ratio, and is therefore substantially equal to the first output torque divided by the starting speed ratio. The control system 134 then transitions between the second input torque and the third input torque between the beginning of the inertia phase and the end of the inertia phase (shown between points 334 and 336).

The third input torque is higher (less negative) than the first input torque because the third gear ratio provides more torque multiplication between the input node 130 and the output node 132 than the fourth gear ratio. Matching the first output torque to the third output torque allows the control system 134 to meet a consistent output torque request even through the speed ratio has increased.

The increase in baseline torque shown on the line 314 between points 334 and 336 is due solely to output torque matching. If the driver (or other torque requestor) alters the output torque request for the vehicle during the inertia phase, the baseline torque may follow a different path.

Referring now to FIG. 4, and with continued reference to FIGS. 1-3, the shift execution chart 400 shows an alternative downshift management scheme or control having output torque matching and also with torque phase offset management. Lines 402, 404, and 406 divide the downshift into the torque phase and the inertia phase.

Line 410 represents output acceleration and output torque, and line 412 input speed of the transmission 114 during the downshift. A line 414 shows the baseline torque and a line 416 shows the net input torque (baseline torque plus the machine torque request). Points 422, 424, 426, and 428 illustrate a first, second, third, and fourth output acceleration (and output torque), respectively. Similar to the previous figures, points 432, 434, 436, and 438 illustrate a first, second, third, and fourth input torque, respectively.

As discussed regarding FIG. 2, increasing the torque-carrying capacity of the oncoming clutch during the torque phase changes the flow of torque between the input node 130 and the output node 132. As the oncoming clutch engages, it effectively changes the torque multiplication powerflow through the transmission 114. This change may be referred to as the torque phase offset.

As shown in FIG. 4, during the torque phase (between lines 402 and 404) of the shift execution chart 400, the control system 134 calculates the torque phase offset while engaging the oncoming clutch. Then the machine torque request is increased by a torque phase offset management to counteract the torque phase offset. Calculating the machine torque request needed to maintain constant output torque and counteract the torque phase offset may include multiplying the first regenerative input torque by the starting speed ratio divided by the finishing speed ratio in order to determine the effect of engaging the oncoming clutch on the output torque.

The increase in the machine torque request is reflected by the increase in the net input torque on the line 416, even though the baseline torque on the line 414 remains constant through the torque phase. Changing the machine torque request allows the increase in the net input torque to reflect only the torque necessary to counteract the torque phase offset and allows for a change in the torque request by the driver to be separately reflected by a change to the baseline torque.

As the oncoming clutch engages, the control system 134 transitions to the second input torque (shown at point 434) during the torque phase. The difference between the second input torque and the first input torque is substantially equal to the torque phase offset management, and the second input torque is substantially equal to the first regenerative input torque multiplied by the starting speed ratio divided by the finishing speed ratio. Note that, in this situation, the increase in net input torque is actually accomplished by a reduction in the regenerative torque applied by the electric machine 118 to the input node 130.

During the inertia phase of the shift execution chart 400, the machine torque request is phased out. Therefore, the net input torque on the line 416 remains substantially constant even as the baseline torque is increased in order to match the ending output torque to the beginning torque, and the third output torque is substantially equal to the second output torque. If the machine torque request was not phased out during the inertia phase, the net input torque would increase along with the baseline torque and the downshift would end with higher output torque than it began.

Referring now to FIG. 5, and with continued reference to FIGS. 1-4, the shift execution chart 500 shows an alternative downshift management scheme or control having output torque matching, torque phase offset management, and also with inertia phase offset management. Lines 502, 504, and 506 divide the downshift into the torque phase and the inertia phase.

A line 510 represents output acceleration and output torque, and a line 512 input speed of the transmission 114 during the downshift. A line 514 shows the baseline torque and a line 516 shows the net input torque (baseline torque plus the machine torque request). Points 522, 524, 526, and 528 illustrate a first, second, third, and fourth output acceleration (and output torque), respectively. Similar to the previous figures, points 532, 534, 536, and 538 illustrate a first, second, third, and fourth input torque, respectively.

Note that during both the shift execution chart 300 shown in FIG. 3 and the shift execution chart 400 shown in FIG. 4, the fourth output torque during the inertia phase still drops below the direct path between the second output torque and the third output torque. As discussed herein, this drop may be referred to as the inertial torque offset, and is easily viewed during the inertia phase of FIG. 4.

Due to the mass of the engine 112 and the electric machine 118, additional torque is required to over come rotational inertia and accelerate the input node 130 from the speed at the beginning of the inertia phase (line 504) to the speed at the end of the inertia phase (line 506). Therefore, the control system 134 will calculate the inertial torque offset necessary to accelerate the input node 130 from the starting speed ratio to the finishing speed ratio. The control system 134 then calculates the fourth input torque (shown as point 538) as substantially equal to the inertial torque offset plus the second torque.

The inertial torque offset is counteracted with the machine torque request (because it is not related to the driver's torque request) and causes a plateau increase in the net input torque shown on the line 516 during the inertia phase. The control system 134 transitions from the second input torque to the fourth input torque at the beginning of the inertia phase, and then back from the fourth input torque to the third input torque at the end of the inertia phase. The variations in the amount of the net input torque (causing the plateau) are needed as the machine torque request moves the input node 130 from slight deceleration at the beginning of the inertia phase to constant acceleration during the bulk of the inertia phase and finally back to slight deceleration.

If the powertrain 110 is configured to decouple the engine 112 from the input node 130, then the ratio change does not require accelerating the engine 112. However, when the engine 112 is not decoupled from the input node 130, the increase in speed may also increase the drag caused by the un-fueled engine 112.

Through management of the torque produced by the electric machine 118, the control system 134 has now controlled the powertrain 110 to provide constant output acceleration and output torque throughout the duration of the shift execution chart 500 shown in FIG. 5. During the torque phase, the machine torque request causes the electric machine 118 to reduce its regenerative torque to counteract the torque phase offset. During the inertia phase, the baseline torque request causes the electric machine 118 to reduce its regenerative torque to counteract the ratio change and match finishing output torque to beginning output torque. Furthermore, during the inertia phase, the machine torque request causes the electric machine 118 to plateau its regenerative torque to counteract the inertia phase offset and then return to the proper finishing output torque.

Figure 6:
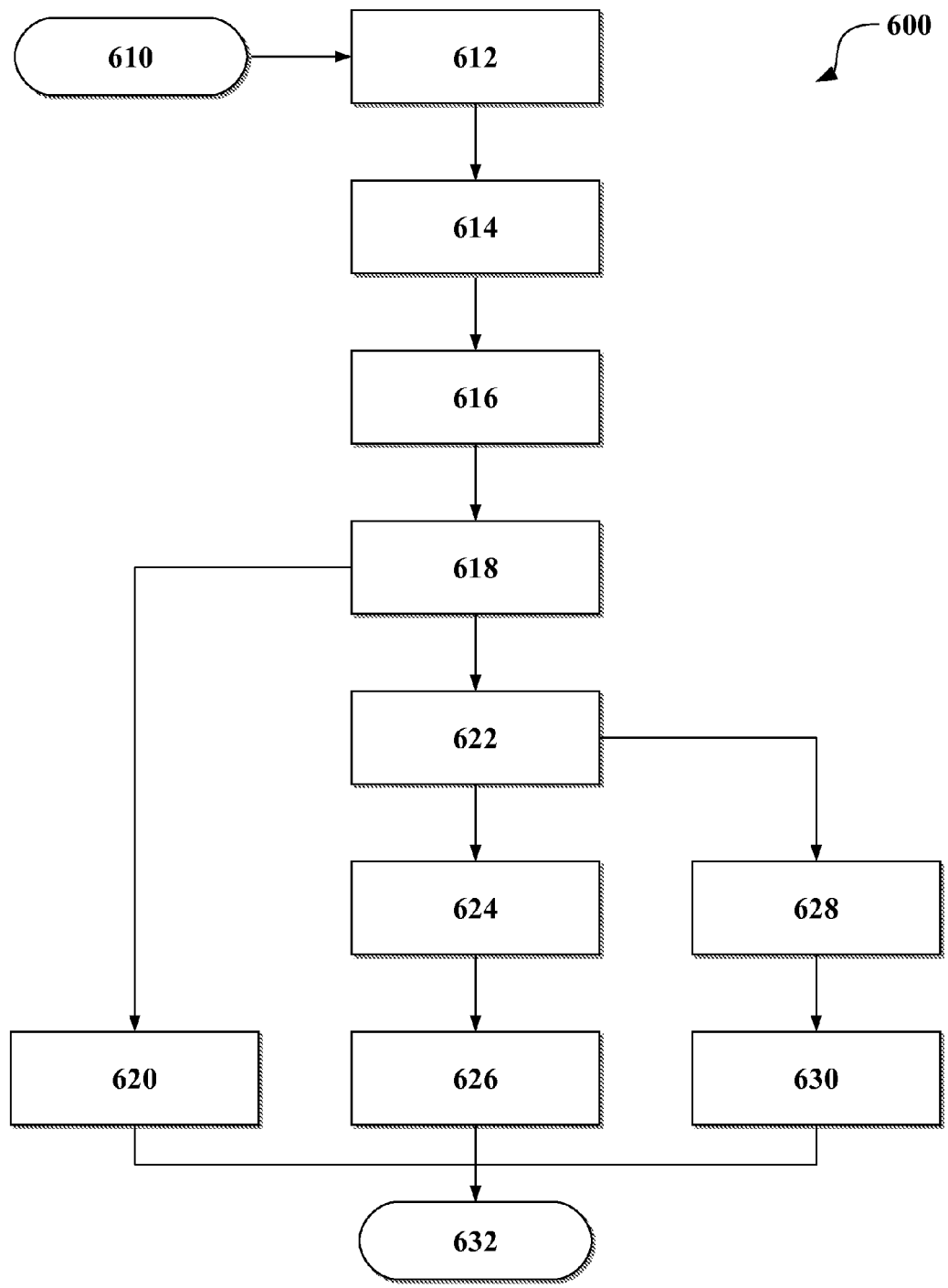
FIG. 6 is a schematic flow chart diagram of an algorithm or method for controlling execution of a negative-torque downshift.

Referring now to FIG. 6, and with continued reference to FIGS. 1-5, there is shown a schematic flow chart diagram of an algorithm or method 600 for controlling execution of a negative-torque downshift.

For illustrative purposes, the method 600 may be described with reference to the elements and components shown and described in relation to FIG. 1. However, other components may be used to practice the method 600 and the invention defined in the appended claims. The method 600 is described in relation to the shift execution chart 500 shown in FIG. 5, but other shift execution and torque management paths may be incorporated into the method 600 and some of the torque management commands shown in FIG. 5 may be omitted. Any of the steps may be executed by multiple components within the control system 134.

The exact order of the steps of the algorithm or method 600 shown in FIG. 6 is not required. Steps may be reordered, steps may be omitted, and additional steps may be included. Furthermore, the method 600 may be a portion or sub-routine of another algorithm or method.

Step 610: Start.

The method 600 may begin at a start or initialization step, during which time the method 600 is monitoring operating conditions of the vehicle and of the powertrain 110. Initiation may occur in response to the vehicle operator inserting the ignition key or in response to specific conditions being met, such as in response to a negative torque request (braking or deceleration request) from the driver or cruise control module combined with a predicted or commanded downshift. Alternatively, the method 600 may be running constantly or looping constantly whenever the vehicle is in use.

Step 612: Determine Torque Request.

The control system 134 determines or calculates the torque request as it applies to the transmission 114. The determination may be converting the request signal (brake pedal position signal or cruise control signal) into the axle torque request or into the output torque request.

Step 614: Determine Starting and Finishing Ratios.

Depending upon the vehicle conditions, the control system 134 may select different shifts. The starting speed ratio may be pre-determined by the current gear selection when the negative torque request is made. However, the starting speed ratio may also be part of the method 600 if, for example, multiple downshifts are being executed consecutively. The control system 134 determines the starting and finishing speed ratios in order to determine the steady-state relationships between input torque and output torque as the transmission 114 executes the downshift.

Step 616: Lock Torque Converter Clutch.

In order to more-efficiently transfer regenerative torque from the electric machine 118 to the transmission 114, the torque converter clutch is locked. The crankshaft 120 and the input member 122 rotate together throughout the downshift event.

Step 618: Map Net Input Torque Request.

The control system 134 takes the starting and finishing speed ratios and the output torque request and determines the net input torque request path for the downshift event. One example of the determined, planned, or mapped net input torque request is shown as the line 516 in FIG. 5. The method 600 then proceeds down substantially simultaneous paths.

Step 620: Execute Baseline Torque.

The baseline torque produced by the electric machine 118 (regenerative torque) and the engine 112 (drag torque) is executed to provide the requested output torque. In many iterations of the method 600, the baseline torque will be configured to provide substantially equivalent output torque levels (output torque matching) at the beginning of the downshift and at the end of the downshift. As shown on the line 514 of FIG. 5, the points 522 and 526 are substantially equivalent. The baseline torque is the driver-request-based torque.

Step 622: Execute Shift Management.

In order to control the output torque characteristics during the downshift, the control system 134 executes the shift-specific torque management properties. The method 600 begins controlling the machine torque request in order to smooth the output torque (line 510 in FIG. 5) during the downshift.

Step 624: Schedule Torque Phase Management.

During or prior to the torque phase, the method 600 calculates the torque phase offset and calculates the torque phase offset management. The determination of the torque phase offset is based upon the difference between the output torque caused by the first input torque at the starting speed ratio (and torque multiplication) and the output torque that would be caused by the first input torque at finishing speed ratio, which is the case if torque phase offset management is not implemented.

Step 626: Execute Torque Phase Machine Torque Request.

The control system 134 executes the machine torque request in order to raise the net input torque (line 516) to counteract the torque phase offset, which would otherwise decrease the output torque between the beginning of the torque phase and the beginning of the inertia phase. The method 600 executes a transition between the first input torque (point 532) and the second input torque (point 534). Therefore, during the torque phase, the output torque remains substantially constant, as shown on the line 510 between the points 522 and 524.

Step 628: Schedule Inertia Phase Management.

During or prior to the inertia phase, the method 600 calculates the inertial torque offset. The determination of the inertial torque offset is based upon the moment of inertia of the rotating components (the engine 112 and the electric machine 118) and the acceleration needed to bring the rotating components from the starting speed ratio to the finishing speed ratio.

Step 630: Execute Inertia Phase Machine Torque Request.

The control system 134 alters the machine torque request away in order to raise the net input torque (line 516) away from the baseline torque (line 514) to counteract the inertia torque offset, which would otherwise temporarily decrease the output torque between the beginning of the inertia phase and the end of the inertia phase. The method 600 follows a plateau path taking the net input torque from the second input torque (point 534) to the fourth input torque (point 538), and then back to the third input torque (point 536). Therefore, during the inertia phase, the output torque remains substantially constant, as shown on the line 510 between the points 524, 528 and 526.

Step 632: End.

The method 600 may end either with combined execution of the torque management elements throughout the downshift or with completion of the downshift. The method 600 may then loop back to the start—especially if the method 600 is looping multiple times through the shift—or may deactivate until another negative-torque downshift is requested.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of executing a downshift in a fixed-gear powertrain having an input node and an output node, wherein the input node is connected to an engine and an electric machine and the output node is connected to a final drive, the input node and the output node are related by a starting speed ratio before the downshift and a finishing speed ratio larger than the starting speed ratio after the downshift, the method comprising:
   executing a torque phase by engaging an oncoming clutch, wherein the torque phase has a beginning and an end and occurs at the starting speed ratio;
   executing an inertia phase after executing the torque phase, wherein the inertia phase has a beginning and an end and brings the input node from the starting speed ratio to the finishing speed ratio;
   calculating a first output torque for the output node;
   calculating a first regenerative input torque at the input node, wherein the first output torque is substantially equal to the first regenerative input torque multiplied by the starting speed ratio;
   applying the first regenerative input torque with the electric machine at the beginning of the torque phase;
   calculating a torque phase offset during the torque phase while engaging the oncoming clutch and a torque phase offset management needed to counteract the torque phase offset; and
   transitioning to a second regenerative input torque during the torque phase, wherein the second regenerative input torque is substantially equal to the first regenerative input torque plus the torque phase offset management.

2. The method of claim 1, further comprising:
   calculating a third output torque which is substantially equal to the first output torque;
   calculating a third regenerative input torque, wherein the third regenerative input torque is substantially equal to the third output torque divided by the finishing speed ratio; and
   transitioning to the third regenerative input torque between the beginning of the inertia phase and the end of the inertia phase.

3. The method of claim 2, further comprising:
   calculating an inertial torque offset necessary to accelerate the input node from the starting speed ratio to the finishing speed ratio;
   calculating a fourth regenerative input torque substantially equal to the inertial torque offset plus the second regenerative input torque;
   transitioning from the second regenerative input torque to the fourth regenerative input torque at the beginning of the inertia phase; and
   transitioning from the fourth regenerative input torque to the third regenerative input torque at the end of the inertia phase.

4. The method of claim 3, wherein calculating the torque phase offset includes multiplying the first regenerative input torque by the starting speed ratio divided by the finishing speed ratio.

5. The method of claim 4, wherein the first output torque, the second output torque, the third output torque, and the fourth output torque are substantially equal.

6. The method of claim 5, further comprising decoupling the engine from the input node during the torque phase and the inertia phase.

7. A method of executing a downshift in a fixed-gear powertrain having an input node and an output node, wherein the input node is connected to an engine and an electric machine and the output node is connected to a final drive, the input node and the output node are related by a starting speed ratio before the downshift and a finishing speed ratio larger than the starting speed ratio after the downshift, the method comprising:
   executing a torque phase by engaging an oncoming clutch, wherein the torque phase has a beginning and an end and occurs at the starting speed ratio;
   executing an inertia phase after executing the torque phase, wherein the inertia phase has a beginning and an end and brings the input node from the starting speed ratio to the finishing speed ratio;
   monitoring a starting driver request at the beginning of the downshift;
   calculating a starting output torque for the output node, wherein the starting output torque is a function of the starting driver request;
   calculating a starting regenerative input torque at the input node, wherein the starting regenerative input torque is substantially equal to the starting output torque divided by the starting speed ratio;
   applying the starting regenerative input torque with the electric machine at the beginning of the torque phase;
   monitoring a finishing driver request at the end of the downshift;
   calculating a finishing output torque for the output node, wherein the finishing output torque is a function of the finishing driver request;
   calculating a finishing regenerative input torque at the input node, wherein the finishing regenerative input torque is substantially equal to the finishing output torque divided by the finishing speed ratio; and
   applying the finishing regenerative input torque with the electric machine at the end of the inertia phase.

8. The method of claim 7, further comprising:
   calculating a torque phase offset during the torque phase while engaging the oncoming clutch; and
   transitioning to a torque phase input torque during the torque phase, wherein the torque phase input torque and is substantially equal to the starting regenerative input torque multiplied by the starting speed ratio divide by the finishing speed ratio, such that the torque phase offset is overcome.

9. The method of claim 8, further comprising:
   calculating an inertial torque offset necessary to accelerate the input node from the starting speed ratio to the finishing speed ratio;
   calculating a temporary inertia input torque substantially equal to the inertial torque offset plus the torque phase input torque;

transitioning from the torque phase input torque to the temporary inertia input torque at the beginning of the inertia phase; and transitioning from the temporary inertia input torque to the finishing regenerative input torque at the end of the inertia phase.

* * * * *